US008104780B1

(12) United States Patent
McConnell-Copploe et al.

(10) Patent No.: US 8,104,780 B1
(45) Date of Patent: Jan. 31, 2012

(54) ADULT ACTIVITY CHAIR

(76) Inventors: Jean McConnell-Copploe, Canfield, OH (US); John Eric McConnell, South Toms River, NJ (US)

(*) Notice: Subject to any disclaimer, the term of this patent is extended or adjusted under 35 U.S.C. 154(b) by 439 days.

(21) Appl. No.: 12/381,414

(22) Filed: Mar. 12, 2009

(51) Int. Cl.
*B62B 7/00* (2006.01)

(52) U.S. Cl. .............................. 280/87.051; 280/47.371

(58) Field of Classification Search ............... 280/87.05, 280/87.051, 42, 7.1, 250.1, 304.1; 297/136, 297/137, 174 R; 482/66, 67
See application file for complete search history.

(56) References Cited

U.S. PATENT DOCUMENTS

| | | | | |
|---|---|---|---|---|
| 2,665,742 | A * | 1/1954 | Starysky | 280/7.1 |
| 2,812,012 | A * | 11/1957 | Hansburg | 297/137 |
| 4,770,410 | A | 9/1988 | Brown | |
| 5,083,806 | A * | 1/1992 | Brown | 280/87.05 |
| 5,407,246 | A | 4/1995 | Meeker et al. | |
| 5,582,464 | A | 12/1996 | Maymon | |
| 5,728,030 | A * | 3/1998 | Hsieh | 482/66 |
| 5,813,948 | A * | 9/1998 | Quigg et al. | 482/67 |
| 5,934,747 | A * | 8/1999 | Garland | 297/136 |
| 6,220,620 | B1 | 4/2001 | Harroun | |
| 6,368,260 | B1 | 4/2002 | Crews | |
| 6,386,563 | B1 * | 5/2002 | Chen et al. | 280/87.051 |
| 6,527,285 | B1 * | 3/2003 | Calandro, II | 280/87.051 |
| 6,595,530 | B2 * | 7/2003 | Wood | 280/42 |
| 7,819,410 | B2 * | 10/2010 | Myers et al. | 280/87.051 |
| 2008/0113581 | A1 * | 5/2008 | Jazenski et al. | 297/136 |

* cited by examiner

*Primary Examiner* — Hau Phan
(74) *Attorney, Agent, or Firm* — Harpman & Harpman

(57) ABSTRACT

An adult seat providing an activity and confinement center for individuals suffering from mental impairments. The seat center is comprised of a stationary seat support having a rotatable seat assembly positioned therewith. A removable interlocking tray portion provides for user access and confinement with integrated tray locking and release and seat rotational control enablement therewithin.

6 Claims, 6 Drawing Sheets

ADULT ACTIVITY CHAIR

BACKGROUND OF THE INVENTION

1. Technical Field

This invention relates to specialized seating devices for persons with impaired mental functions that require constant supervision by a caregiver.

2. Description of Prior Art

Prior art has been directed to devices for rehabilitation care oriented environments which deal with a variety of physical and mental disabling conditions. Such devices provide for a seat base structure in which an individual is positioned for ambulatory and support confinement, see for example U.S. Pat. Nos. 4,770,410, 5,083,806, 5,407,246, 5,582,464, 6,220,620 and 6,368,260.

In U.S. Pat. No. 4,770,410 a walker is disclosed with a seat and a height adjustable wheel support frame.

U.S. Pat. No. 5,083,806 is directed to an adult walker in both seated and standing position. The walker has a mobile frame with a strap seat suspended therefrom which can be height adjusted.

A child exercise rocker is disclosed in U.S. Pat. No. 5,407,246 having a rotating seat and an annular support frame on a bowl shape base. Spring support linkage allows for undulating seat movement and imparted rocking motion.

U.S. Pat. No. 5,582,464 claims a chair for use with spinal cord injury having articulated back and seat with a tray.

U.S. Pat. No. 6,220,620 discloses a wheel height adjustable rehabilitation chair having a wheel base with a support chair thereon.

Finally, in U.S. Pat. No. 6,368,260 an exercise system for persons with physical disability can be seen wherein a chair having a table top with a mobile support step is disclosed.

SUMMARY OF THE INVENTION

An activity center chair for adults who are mentally impaired due to disease or brain injury. The chair provides for a limited access seat with an interlocking tray restraint that allows for the performance of mental task related to the skill level and activity ability of the user. Access and egress is controlled by the caregiver assuring a location verification and activity determination of the patient.

DETAILED DESCRIPTION OF THE INVENTION

Figure 1:
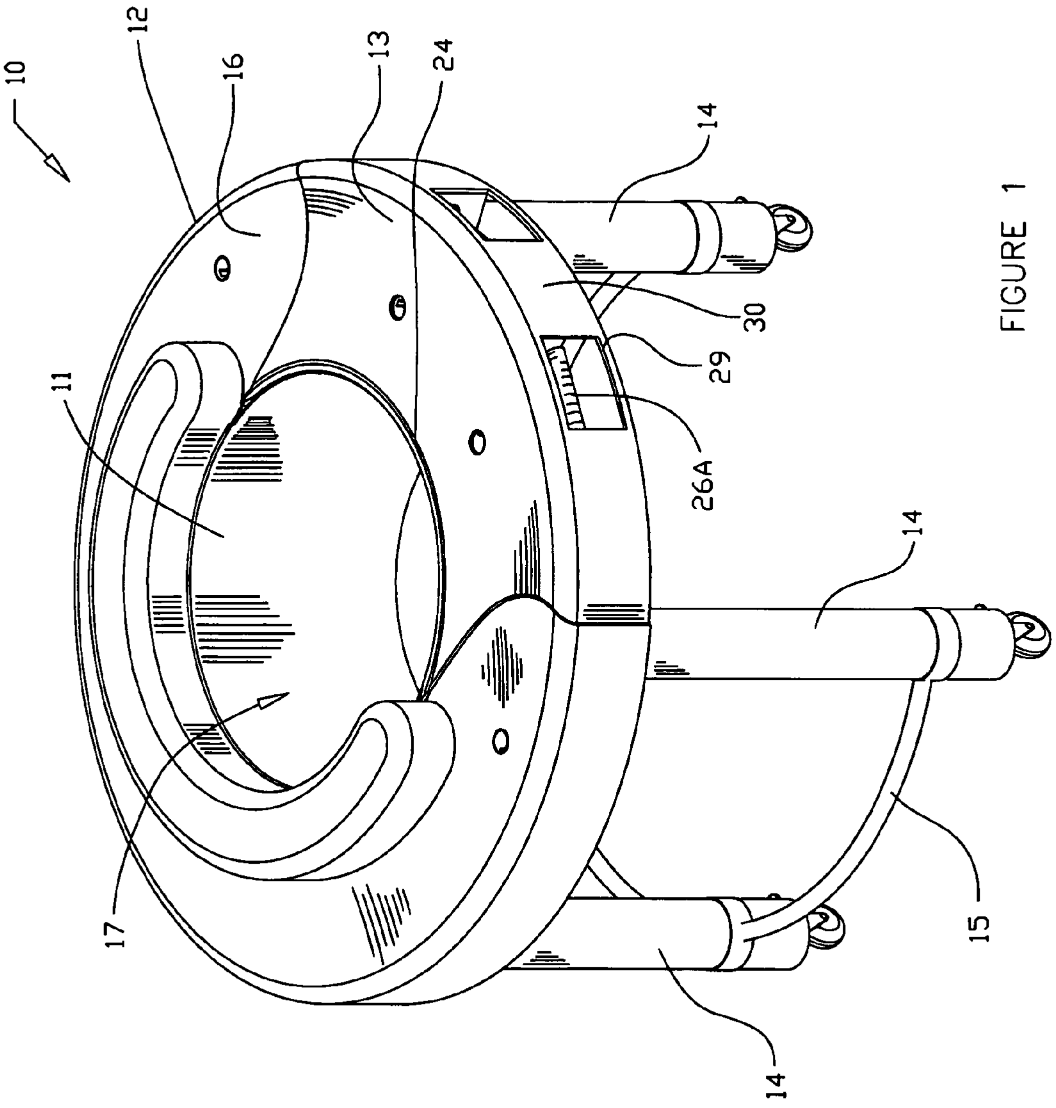
FIG. 1 is a perspective view of the activation chair in accordance with the invention.
Figure 2:
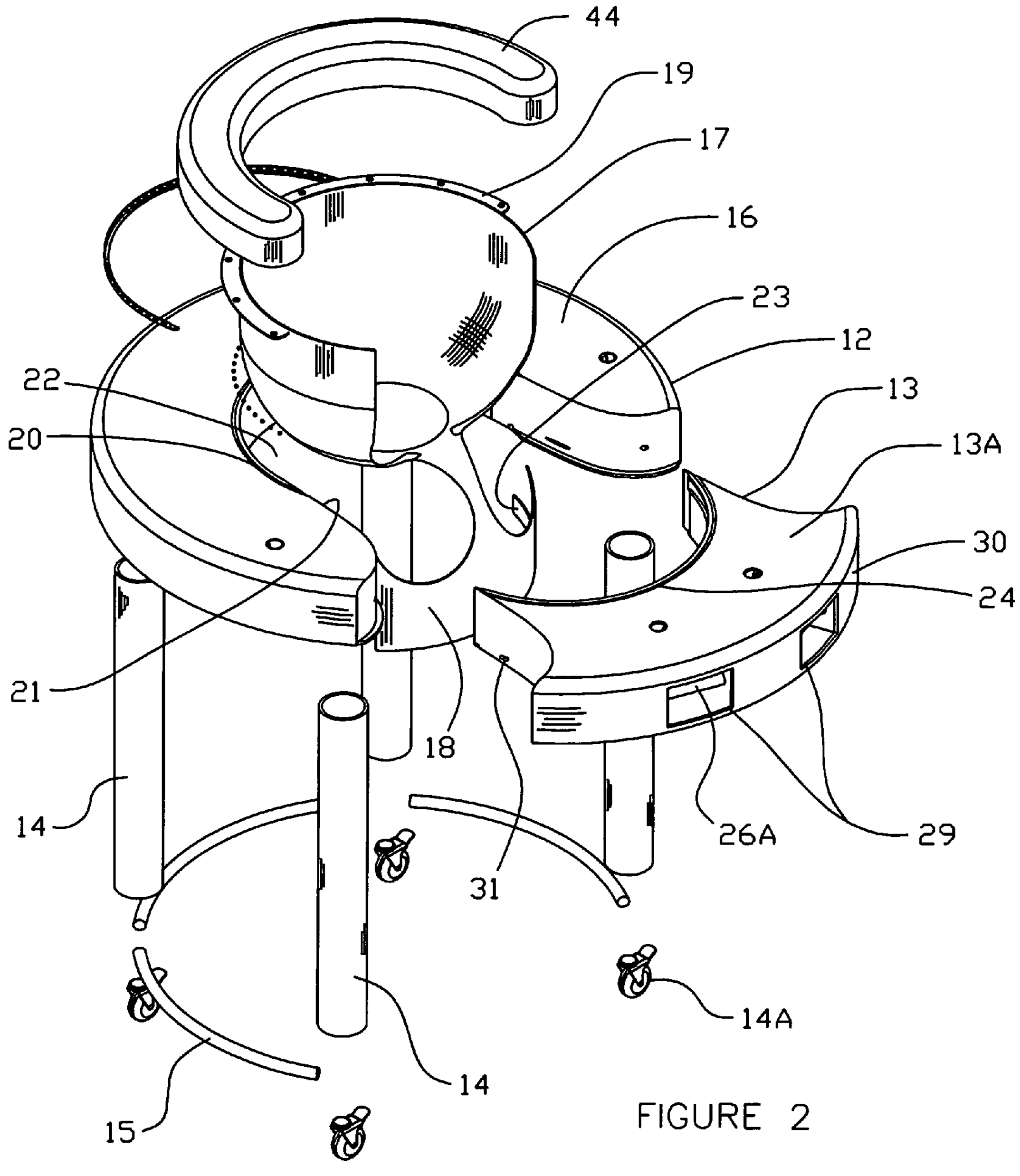
FIG. 2 is an exploded perspective view thereof.

Referring to FIGS. 1 and 2 of the drawings, an activity chair 10 for adults can be seen including a seat portion 11, and a seat support frame 12 and interlocking tray 13. The support frame 12 has a plurality of tubular legs 14 extending therefrom which are interconnected by a lower ring element 15 inwardly of the respective ground engagement ends. The seat support frame 12 extends partially about the seat portion 11 enclosing the upper ends of the tubular support legs 14 and forming a flat activity surface area 16 thereabout. Roller wheel assemblies 14A are registerably secured from the free ends of support legs 14.

The seat portion 11 has a seat 17 which is rotatably supported from the support frame 12 and is of a rigid bowl shaped configuration with an apertured bottom with flexible fabric front hinge portion 18 with cut-away portions 18A and 18B as can best be seen in FIG. 2 of the drawings.

Figure 3:
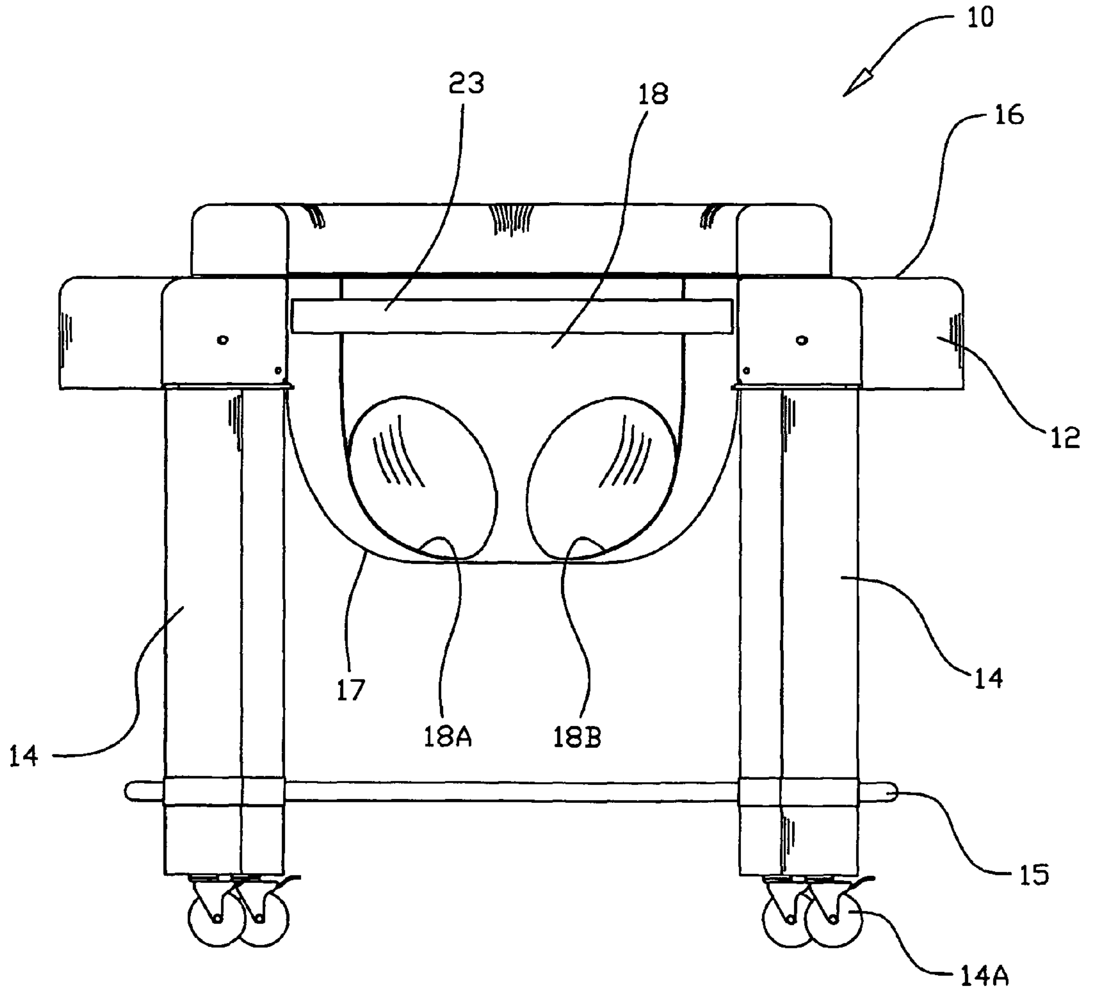
FIG. 3 is a front elevational view of the activity chair of the invention.

A roller bearing seat support flange assembly 19 extends from a portion of the upper edge of the seat 17 and is registerable with a corresponding guide track 20 formed along the inner edge 21 of a seat receiving opening at 22 defined by the seat support frame 12. The flexible front hinge portion 18 of the seat 17 is selectively secured in closed position by a fabric hook and loop fastener tab element 23 extending laterally thereabout registerably on corresponding engagement portions, best seen in FIGS. 2 and 3 of the drawings. The cut-away openings 18A and 18B in the front hinge portion 18 of the seat 17 defines patient leg openings when in closed position as best seen in FIG. 3 of the drawings helping to retain and support the user/patient position therewithin (not shown).

The interlocking tray 13 is of a contoured arcuate configuration for integrated registering engagement with the ends of seat support frame 12 during use. The tray 13 has a flat upper activity surface 13A with a seat track guide 24 therein that when engaged aligns with the hereinbefore described guide track 20 allowing for 360° rotation of the seat 17 with the tray 13 in place.

Figure 4:
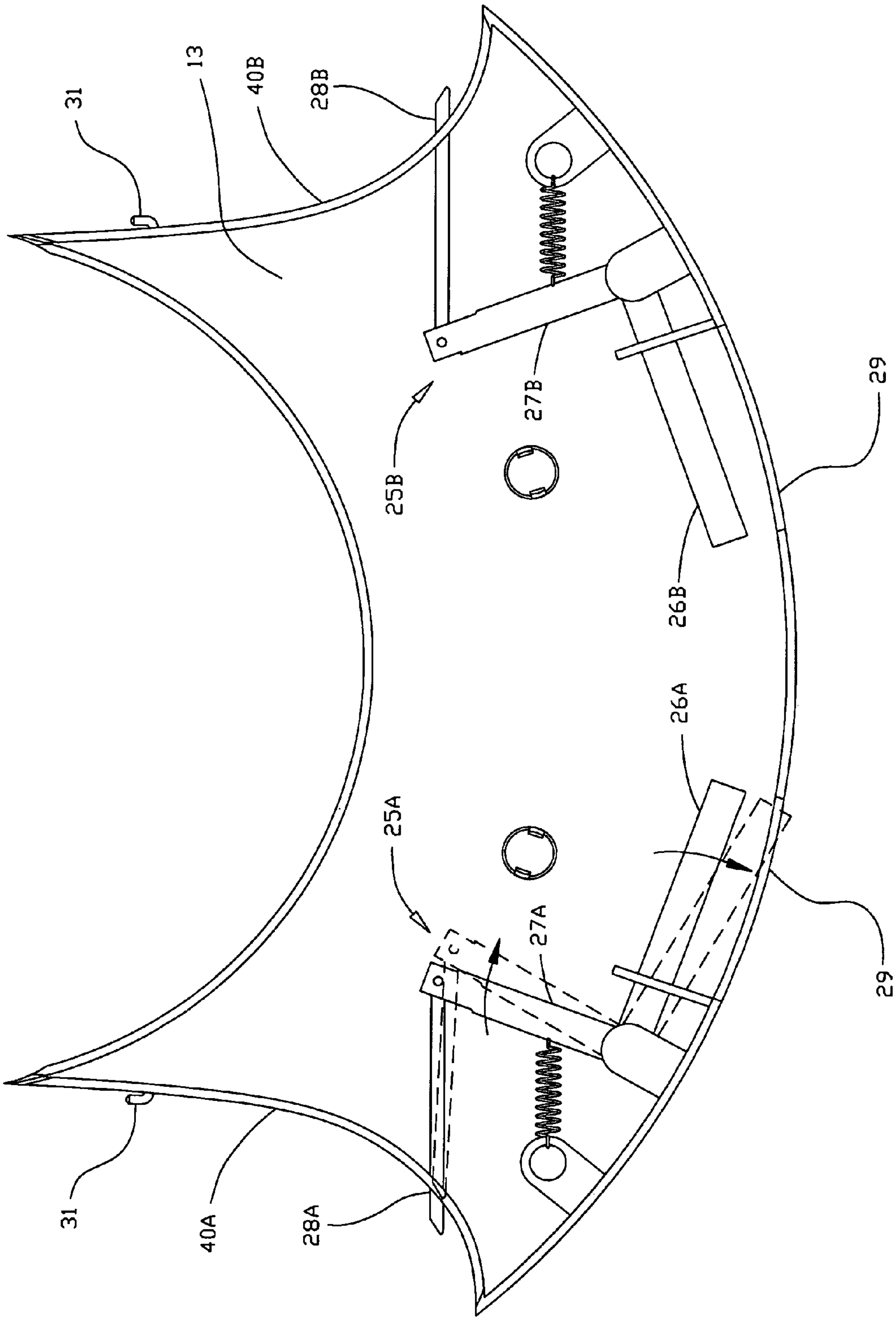
FIG. 4 is an enlarged top plan view of the restraint activity tray with portions broken away for illustration.
Figure 5:
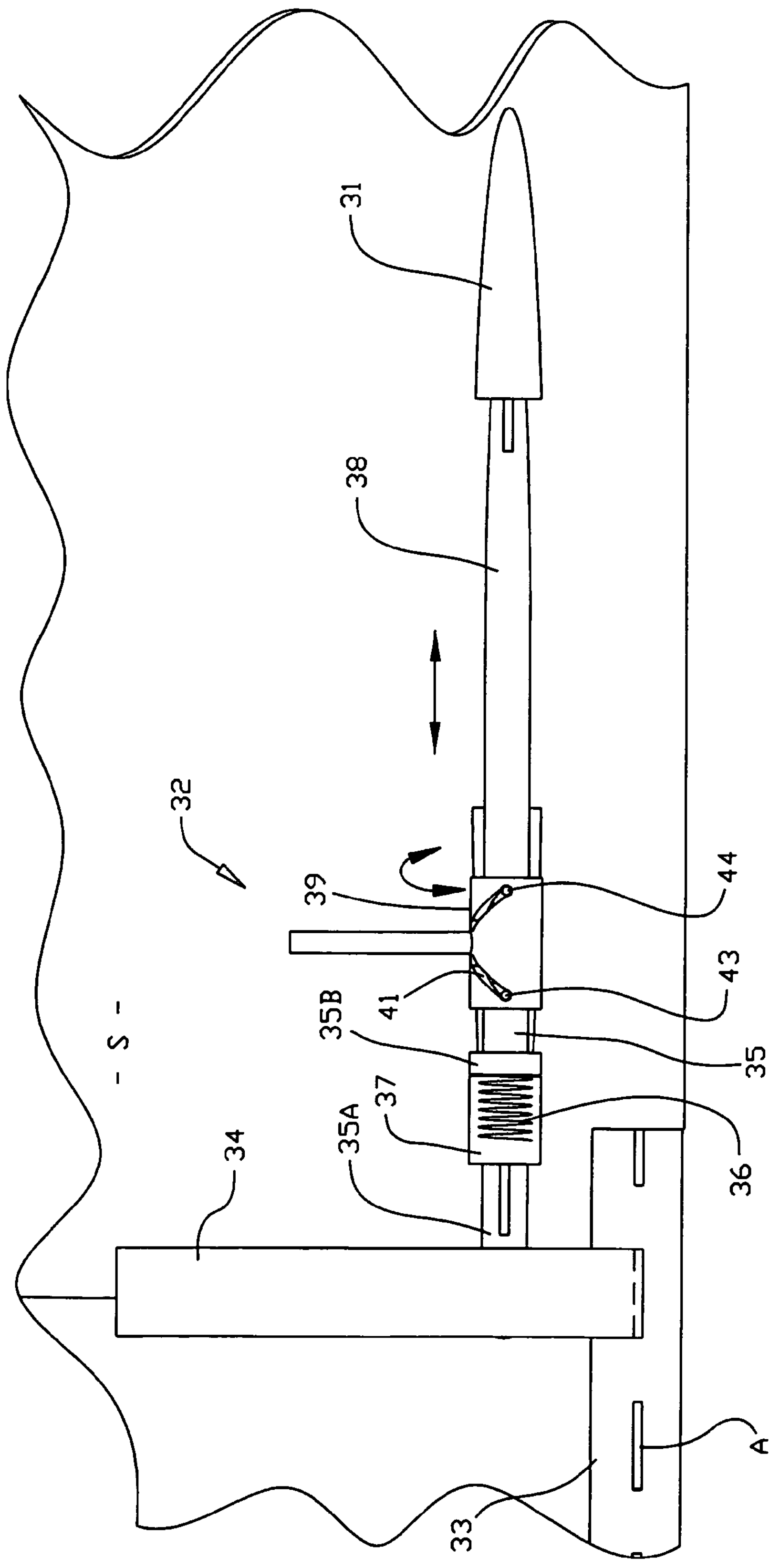
FIG. 5 is an enlarged partial top plan view of the activity tray and seat rotational locking assembly.

The tray 13 is selectively retained by release assemblies 25A and 25B, as best seen in FIGS. 4 and 5 of the drawings including a pair of release handles 26A and 26B pivotally secured to respective spring urged linkage 27A and 27B with pivoted end retainment pins 28A and 28B extending respectively outwardly therefrom.

A pair of access openings at 29 are formed in a depending front surface 30 of the tray 13 through which only the caregiver (not shown) can gain access and grasp the respective control handles 26A and 26B as shown in broken lines and indicator arrows retracting the pins 28, releasing the tray 13 for removal. It will be seen that once the tray 13 is locked in place, that the activity area 16 will now extend completely around the seat 17 with the addition of the tray 13's upper activity surface 13A, as best seen in FIG. 1 of the drawings.

Figure 6:
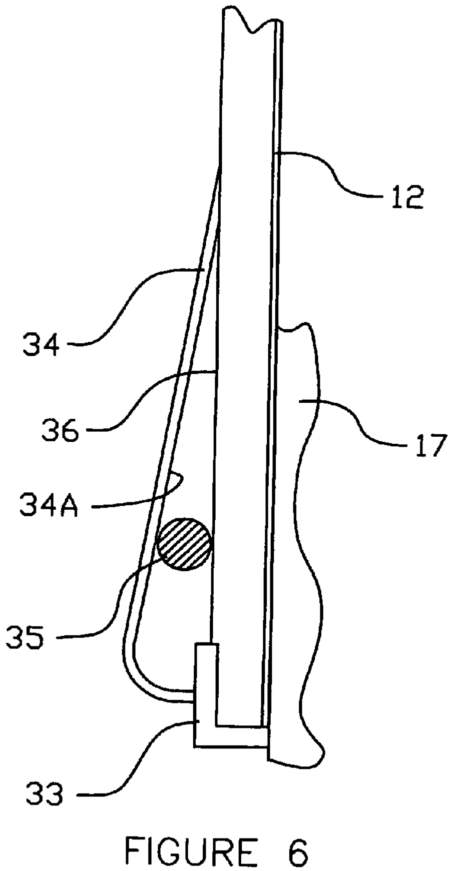
FIG. 6 is an enlarged side elevational view of the seat rotation locking assembly.

Referring now to FIGS. 5 and 6 of the drawings, the tray release assembly 25A can be seen registerably engaged with the corresponding portions of the seat frame 12. The tray 13 has a pair of seat rotation control fitting extensions 31 which are in turn engageable with seat rotational locking assemblies 32 that will lock the seat 17 in a tray facing position when the tray 13 is removed allowing for ease of patient egress via release of the hinge portion 18 thereof.

Figure 7:
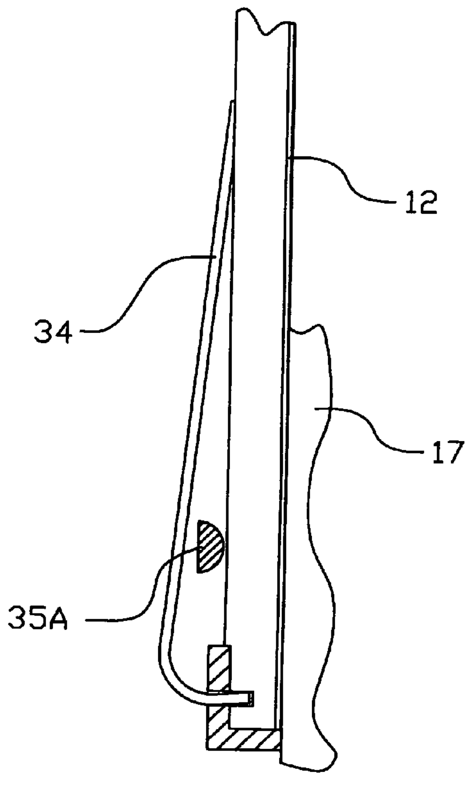
FIG. 7 is an enlarged end view on lines 7-7 of FIG. 6 in locked position.

The seat locking assemblies 32 include an upstanding apertured flange 33 extending in spaced relation from the seat 17 arcuately thereabout. A resilient latch member 34 extends from the support frame's side surface S for selective aligned registration within longitudinally spaced elongated apertures A in the flange 33 as best seen in FIGS. 6 and 7 of the drawings.

A tapered actuation pin rod 35 is arranged for slidable deployment between an interior surface 34A of the latch member 34 and a registration surface 36. The pin rod 35 has a tapered flange latch engagement end portion 35A with an annular flange 35B for engagement with a spring 36 and a spring retainer sleeve 37. The pin rod 35 is interlinked to an activation rod 38 arranged for aligned engagement by the hereinbefore described seat rotation enabling pins 31 extending from the respective interengagement surfaces 40A and 40B of the tray 13. The pin rod 35 and activation rod 38 are secured together by an independent manual seat lock override control cylinder 39 having a contoured control slot 41 therein. A manual engagement lever 42 extends from the cylinder 39 allowing axial rotation thereof by the caregiver. The pin rod 35 and activator rod 38 have linkage pins 43 and 44 extending from their surfaces which are registerably engaged into the hereinbefore described slot 41 on the control cylinder 39, best seen in FIG. 6 of the drawings.

It will be evident from the above description that when the activity tray 13 is fitted into the support frame 12 and secured by the locking and release assemblies 25A and 25B that the tapered pin rod 35 will be forced against the retaining spring 36 and correspondingly tapered latch engagement portion 35A against the latch 34 releasing same allowing for free rotation of the seat 17 on its roller bearing assembly as hereinbefore described.

To manually override and impart a static rotation lock to the seat 17, the cylinder 39, as noted, can be rotated by the caregiver effectively disconnecting by respective lateral rod displacement the activation rod 38 from the pin rod 35 allowing same to retract under the spring resistance and maintain a latch member 34 locking engagement with the seat even with the tray fully engaged.

In use, the adult activity chair 10 of the invention will have an arcuate foam support cushion 44 positioned partially around the seat opening of the seat portion 11 on the support frame 12 activity surface 16. The tray 13 is released from the support frame 12 by activation of the dual tray release handles 26A and 26B which retract the corresponding linked locking pins 28A and 28B allowing the tray 13 to be manually removed. As the tray 13 is removed, the effective "fail safe" locking of the seat will be activated locking the seat 17 from rotation with the seat 17 in a tray front facing position. The seat 17 can be accessed with the front hinge portion 18 release via the fastener tab elements 20 allowing the lowering of the flexible hinge front portion 18. The mentally impaired adult (not shown) is then guided for positioning within the seat 17 and the hinge portion 18 is refastened to the appropriate surfaces via the fastener tabs. The activity retainment tray 13 is repositioned and secured releasing the hereinbefore described rotational seat locking assembly allowing for full rotation of the seat on the seat bearing assembly. The user will not be able to effectively reach the enclosed recessed release handles 26A and 26B assuring that non-supervised access removal egress from the seat 17 can be effective by the user once positioned therewithin.

It will thus be seen that a new and novel adult activity chair device has been illustrated and described and it will be apparent to those skilled in the art that various changes and modifications may be made thereto without departing from the spirit of the invention.

We claim:

1. An adult activity seat for containment seating of an occupant comprising, a seat support frame and a rotating seat portion therewithin, a plurality of support legs extending from said support frame, a tray portion removably secured to said seat support frame by movable handles with linkage assemblies in access openings in said tray selectively registerable with said support frame, an activity surface area about said seat portion comprising, upper surfaces of said support frame and said tray portion in co-planar relation to one another, means for locking rotation of said seat portion within said support frame portion when said tray portion is removed therefrom.

2. The adult activity seat set forth in claim 1 wherein said seat portion comprises a seat rotatable suspended from said support frame and a hinge access portion of said seat having leg access openings therein and resilient engagement fasteners in selective registration with said remaining seat portion.

3. The adult activity seat set forth in claim 1 wherein said means for locking rotation of said seat portion within said support frame comprises, a resilient latch member and interengaging release linkage rod and pin on said support frame, a fixed release fitting extending from said tray portion engageable on said release linkage when said tray portion is in locked position.

4. The adult activity seat set forth in claim 3 wherein said release linkage rod and pin comprises, a tapered pin rod, a selectively engaged linking rod and spring urged means on said pin rod.

5. The adult activity seat set forth in claim 1 wherein said access openings for interlocking handles in said tray are in oppositely disposed spaced relation to said seat portion.

6. The adult activity seat set forth in claim 1 wherein said rotating seat portion further comprises, roller bearing seat support registerable in a guide track in said seat support frame and said tray portion.

* * * * *